(12) United States Patent
Velaga

(10) Patent No.: US 10,102,101 B1
(45) Date of Patent: Oct. 16, 2018

(54) METHODS, SYSTEMS, AND COMPUTER READABLE MEDIUMS FOR DETERMINING A SYSTEM PERFORMANCE INDICATOR THAT REPRESENTS THE OVERALL OPERATION OF A NETWORK SYSTEM

(71) Applicant: VCE Company, LLC, Richardson, TX (US)

(72) Inventor: Srinivasa Rao Velaga, Campbell, CA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 862 days.

(21) Appl. No.: 14/289,019

(22) Filed: May 28, 2014

(51) Int. Cl.
*G06F 11/34* (2006.01)
*H04L 12/26* (2006.01)

(52) U.S. Cl.
CPC .......... *G06F 11/3419* (2013.01); *H04L 43/08* (2013.01)

(58) Field of Classification Search
CPC .... G07C 5/0808; G07C 5/008; G07C 5/0841; H04L 41/064; H04L 43/04; H04L 43/067; H04L 43/08; H04L 43/022; H04L 43/16; H04L 41/12; H04L 41/0631; H04L 41/5009; H04L 67/10; H04L 43/065; G06F 11/3065; G06F 2201/87; G06F 11/3495; G06F 11/3428; G06F 11/3409; G06F 11/3452; G06F 11/3466; G06F 3/0653; G06F 11/323; G06F 11/3457; G06F 2201/865; G06Q 10/0639; G06Q 10/06395; F05D 2260/80; F05D 2260/81
See application file for complete search history.

(56) References Cited

U.S. PATENT DOCUMENTS

| | | | | |
|---|---|---|---|---|
| 6,311,144 B1* | 10/2001 | Abu El Ata | ............ | G06F 17/10 703/13 |
| 7,350,195 B2* | 3/2008 | Herbeck | ............. | G06F 11/3409 714/E11.207 |
| 7,363,543 B2* | 4/2008 | Peebles | ............... | G06F 11/0715 714/26 |
| 9,736,046 B1* | 8/2017 | Jain | ..................... | H04L 43/0823 |
| 2002/0184131 A1* | 12/2002 | Gatto | ..................... | G06Q 40/00 705/36 R |
| 2003/0131286 A1* | 7/2003 | Kaler | .................... | G06F 11/302 714/39 |
| 2005/0066326 A1* | 3/2005 | Herbeck | ............. | G06F 11/3409 718/100 |

(Continued)

*Primary Examiner* — Sargon N Nano
(74) *Attorney, Agent, or Firm* — Jenkins, Wilson, Taylor & Hunt, P.A.

(57) ABSTRACT

Methods, systems, and computer readable mediums for determining a system performance indicator representative of the overall operation of a network system are disclosed. According to one example, a method includes obtaining, from a plurality of infrastructure elements included in a network system, performance metric data associated with a plurality of application processes being executed by the plurality of infrastructure elements. The method further includes consolidating analogous portions of the performance metric data into a plurality of performance metric data groups irrespective of the plurality of infrastructure elements and utilizing the plurality of performance metric data groups to determine a system performance indicator (SPI) value that represents an overall performance level of the network system.

20 Claims, 3 Drawing Sheets

(56) References Cited

U.S. PATENT DOCUMENTS

| | | | |
|---|---|---|---|
| 2005/0119996 A1* | 6/2005 | Ohata | G06F 11/3495 |
| 2007/0150581 A1* | 6/2007 | Banerjee | H04L 41/22 |
| | | | 709/224 |
| 2008/0021994 A1* | 1/2008 | Grelewicz | G06F 11/3428 |
| | | | 709/224 |
| 2009/0199113 A1* | 8/2009 | McWhinnie | G06Q 10/06 |
| | | | 715/762 |
| 2010/0202465 A1* | 8/2010 | Sakata | H04L 45/302 |
| | | | 370/400 |
| 2011/0028093 A1* | 2/2011 | Patel | H04B 17/27 |
| | | | 455/41.2 |
| 2011/0295655 A1* | 12/2011 | Tsuji | G06Q 10/0639 |
| | | | 705/7.38 |
| 2012/0066558 A1* | 3/2012 | Duchenay | H04L 41/064 |
| | | | 714/57 |
| 2012/0166636 A1* | 6/2012 | Page | G06F 11/3409 |
| | | | 709/224 |
| 2013/0110934 A1* | 5/2013 | Shibuya | G06F 17/30091 |
| | | | 709/204 |
| 2013/0176148 A1* | 7/2013 | Harrison | G07C 5/0808 |
| | | | 340/963 |
| 2014/0195446 A1* | 7/2014 | Yurach | G06F 11/3055 |
| | | | 705/317 |
| 2015/0120907 A1* | 4/2015 | Niestemski | H04L 67/1097 |
| | | | 709/224 |
| 2015/0149389 A1* | 5/2015 | Chung | G06Q 30/0283 |
| | | | 705/412 |
| 2016/0180030 A1* | 6/2016 | Gunawardena | G06Q 50/22 |
| | | | 705/2 |
| 2017/0187602 A1* | 6/2017 | Pathela | H04L 43/0852 |

\* cited by examiner

METHODS, SYSTEMS, AND COMPUTER READABLE MEDIUMS FOR DETERMINING A SYSTEM PERFORMANCE INDICATOR THAT REPRESENTS THE OVERALL OPERATION OF A NETWORK SYSTEM

TECHNICAL FIELD

The subject matter described herein relates to the monitoring and management of a computer network system. More specifically, the subject matter relates to methods, systems, and computer readable mediums for determining a system performance indicator that represents the overall operation of a network system.

BACKGROUND

Performance management and monitoring aimed to create an optimum end-user experience within a traditional converged infrastructure space is presently a challenging undertaking. Every component or element utilized in a converged infrastructure may affect the overall performance of the system and the end-user experience to varying degrees. Notably, the monitoring of each and every system component and the subsequent consolidation of the performance metrics used to derive data for analysis are both expensive and time consuming. For example, collecting performance metric data from different sources and applications, exporting of said performance metric data, and ultimately resolving the performance metric data in order to understand the performance of a network system can prove to be extremely cost prohibitive to the entities operating the aforementioned converged infrastructures.

SUMMARY

Methods, systems, and computer readable mediums for determining a system performance indicator representative of the overall operation of a network system are disclosed. According to one embodiment, a method includes obtaining, from a plurality of infrastructure elements included in a network system, performance metric data associated with a plurality of application processes being executed by the plurality of infrastructure elements. The method further includes consolidating analogous portions of the performance metric data into a plurality of performance metric data groups irrespective of the plurality of infrastructure elements and utilizing the plurality of performance metric data groups to determine a system performance indicator (SPI) value that represents an overall performance level of the network system.

BRIEF DESCRIPTION OF THE DRAWINGS

The subject matter described herein will now be explained with reference to the accompanying drawings of which.

DETAILED DESCRIPTION

Figure 1:
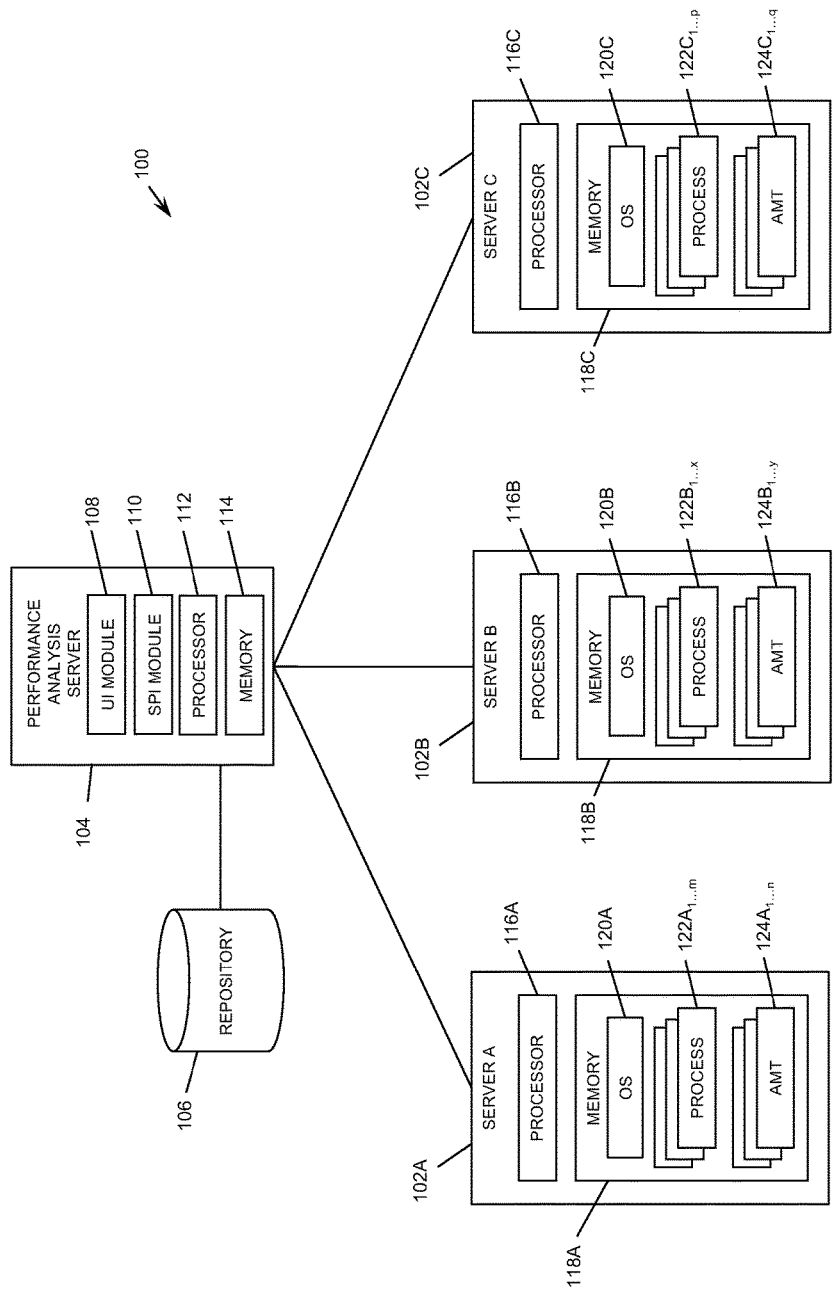
FIG. 1 illustrates an exemplary network system for determining a system performance indicator representative of the overall operation of the network system in accordance with embodiments of the subject matter described herein.

The subject matter described herein discloses methods, systems, and computer readable mediums for determining a system performance indicator (SPI) representative of the overall operation of the network system. In some embodiments, the disclosed subject matter utilizes performance metric data measured by individual infrastructure elements to ascertain the overall health of a network system based on end-user experience and hardware performance. For example, the disclosed subject matter may involve the acquisition of various performance metrics associated with the individual application processes currently being executed within a network system. In some embodiments, the performance metric data may be separately monitored by the system's infrastructure elements, which are configured to measure the application response times (e.g., service times and transaction response times) associated with each of the individual application processes being run. After receiving the performance metric data from the infrastructure elements, an SPI module may be configured to consolidate the data into separate performance metric data groups irrespective of the originating infrastructure elements. The SPI module may be further configured to utilize the performance metric data groups (e.g., a service time group and a transaction response time group) to determine a SPI value, which can comprise a single metric indicator that represents the overall performance of the network system.

In some embodiments, the disclosed subject matter can be utilized within a network system that is distributed among a plurality of discrete network segments (e.g., a single computer network system location or geographically separated computer network system) and/or a converged infrastructure system (CIS). As used herein, a CIS, such as a Vblock™ System from VCE Company, LLC, can comprise multiple converged infrastructure elements (CIEs) in a preconfigured or prepackaged computing platform. For example, a CIS can include a single computing platform unit associated with racks of physical CIEs and related software for performing virtualization and/or other information technology (IT) functions. In some embodiments, each CIE associated with a CIS can comprise a compute component, a software component, a networking component, a hardware component, or a firmware component. For example, a CIS can comprise data storage devices, compute devices (e.g., a unified computing system device), networking equipment (e.g., switch devices), and software for managing physical resources and/or virtualized resources (e.g., virtual servers). In some embodiments, both the distributed network system and CIS architecture may be utilized jointly together without departing from the scope of the disclosed subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary network system, generally designated 100, according to an embodiment of the subject matter described herein. Network system 100 includes a performance analysis server 104, a repository 106, and a plurality of infrastructure elements, such as computer servers 102A-C. In some embodiments, computer servers 102A-C may include one or more computer network servers, application servers, file servers, database servers, web servers, mail servers, and/or the like. In some embodiments, servers 102A-C may be collectively utilized to host and support the execution of one or more applications. As used herein, an "application" may include any application program that utilizes a plurality of processes (e.g., subprograms, workload services, software algorithms, etc.) to perform an activity or service that may be useful to a user. Exemplary applications include, but are not limited to, an electronic mail service application, a web-based banking application, a multimedia streaming application, and the like. Although FIG. 1 only depicts three servers 102A-C, network system 100 may include and/or utilize additional servers without departing from the scope of the disclosed subject matter.

In some embodiments, each server 102 may include at least a processor 116 and memory 118. Each of processors 116A-C may include a microprocessor (e.g., a trusted platform module (TPM) using trusted execution technology (TXT)), a central processing unit (CPU), or any other like hardware based processing unit. Likewise, memory 118A-C may include random access memory (RAM), read only memory (ROM), optical read/write memory, cache memory, magnetic read/write memory, flash memory, or any other non-transitory computer readable medium. In some embodiments, each of memory 118A-C may respectively include and/or support an operating system (OS) 120 (e.g., Windows OS, Linux OS, etc.), a plurality of application processes 122, and a plurality of application management tools $124_{1 \ldots n}$. For example, one or more of application processes $122A_{1 \ldots m}$ may be associated with a particular application or application workflow that is supported and/or executed by server 102A. As used herein, an application process includes an application workload service, subprogram, software algorithms, and the like. Similarly, each application (not shown) supported by server 102A may include and/or be associated with one or more of built-in application management tools $124A_{1 \ldots n}$. The functionalities of each of these elements included in server 102A will be described in greater detail below.

As indicated above, operating system 120A may include a built-in software tool that is configured to measure certain performance metrics associated with an application process being executed by server 102A. In some embodiments, server 102A may determine the service time for each of the application processes that is executed by processor 116A and/or operating system 120A. As used herein, the term "service time" includes the amount of time an infrastructure element (e.g., server 102A or a CIS compute component) takes to completely execute an application process in response to an application related request (e.g., a request from an end-user). In some embodiments, the service time of an application process is calculated and/or determined by operating system 120A and/or its associated built-in tools.

Similarly, the transaction response time for each of the application processes that is executed by processor 116A and/or operating system 120A may be determined by one or more of application management tools 124A. Exemplary application management tools include, but are not limited to, SiteScope™, CA Introscope®, Foglight™, and the like. As used herein, the term "transaction response time" includes the time duration an end-user experiences as the server 102A completely processes a responses to the end-user's request. For example, the transaction response time may include the duration existing between the point in time an end-user's request or query is received by server 102A and the point in time a corresponding response leaves from server 102A to the end-user. In some embodiments, the transaction response time may include i) any time the received request remains in a processing queue (e.g., wait time for server resources) and ii) the actual processing time (e.g., the service time indicated above).

As indicated above, network system 100 may further include a performance analysis server 104 that is communicatively connected to servers 102A-C. Notably, performance analysis server 104 may be configured to receive the determined service times and transaction times of the application processes being executed on servers 102A-C from each of servers 102A-C. In some embodiments, servers 102A-C may be communicatively linked to performance analysis server 104 via a direct connection, a wireless connection, and/or through a communications network, such as the Internet (not shown). As shown in FIG. 1, performance analysis server 104 may include a user interface (UI) module 108, a system performance index (SPI) module 110, at least one processor 112, and at least one memory 114. In some embodiments, processor 112 and memory 114 may be similar to processors 116A-C and memory 118A-C as described above in both form and function. Notably, processor 112 and memory 114 may be used to execute UI module 108 and SPI module 110. In some embodiments, UI module 108 may provide and support a user interface that can be utilized by a system administrator to manage at least one application, its associated application processes, and the associated infrastructure components used to implement the managed application. Notably, UI module 108 may enable a system administrator, via the user interface, to designate the application processes that need to be measured (as well as designate the processes to be ignored) for an SPI value calculation. In some embodiments, the user interface supported by UI module 108 may include a graphical user interface (GUI) that is implemented either as a remote service using a remote presentation protocol (e.g., an HTML5 service) or as a dedicated application. The user interface supported by UI module 108 may also include a command line interface (CLI). In some embodiments, UI module 108 may be utilized by a system administrator to request the immediate generation of an SPI value by SPI module 110 or set the frequency in which SPI module 110 determines a current SPI value. For example, SPI module 110 may be preconfigured by a system administrator to query one or more of servers 102A-C on a periodic basis. Alternatively, UI module 108 may be utilized to configure each of servers 102A-C to automatically provide the performance metric data to performance analysis server 104 on a periodic basis (i.e., without a receiving query from server 104).

In some embodiments, SPI module 110 may include a software module that is configured to consolidate performance metric data obtained from servers 102A-C in real time order to generate a SPI value that represents the overall health and performance level of network system 100. To accomplish this functionality, SPI module 110 may be configured to obtain the relevant performance metric data from each of servers 102A-C (e.g., infrastructure elements). Notably, the performance metric data received from servers 102A-C can include metric data related to the plurality of application processes (as opposed to the application itself) being executed by each of servers 102A-C. For example, the performance metric data obtained by SPI module 110 may include a service time and a transaction response time associated with each of the application processes being executed on servers 102A-C.

In some embodiments, each of servers 102A-C may conduct the monitoring for the performance metric data at the operating system level. Namely, each of operating systems 120A-C may respectively utilize a built-in tool (not shown) to monitor and/measure the service time of every application process 122 run by the operating system. Notably, the built-in tool monitors and measures application processes and not the application workload itself. For example, operating system 120A may determine that server 102A is hosting a single application workload that includes five application processes (e.g., processes $102A_{1...5}$). By utilizing the aforementioned built-in tool, operating system 120A can measure the service time for each of application processes $102A_{1...5}$. As indicated above, the service time of an application process refers to the amount of time the application process is completely processed in response to a request from an end-user (e.g., a request for an associated application).

In addition, server 102A may include at least one application management tool 124A that is associated with the aforementioned application workload. Notably, application management tool 124A (with or without assistance from operating system 120A) may be configured to measure the transaction response time for each of application processes $102A_{1...5}$. As indicated above, the transaction response time of an application process refers to the amount of response time an end-user experience upon requesting the execution of an application workload or an application process. The transaction response time may be based on the application and/or the infrastructure element(s) being used to support the application. Notably, servers 102B and 102C are also obtaining the performance metric data (i.e., the service times and transaction response times) associated with their respective supported application processes in a similar manner described above with respect to server 102A. In some alternative embodiments, an operating system may be configured to measure the transaction response time. For example, operating system 120A may include a function accessible by a user (e.g., via a "top" command) that is configured to list all of the processes running on server 102A. Specifically, operating system 120A may display both the processing time and the wait time for each process. Notably, the transaction response time may be determined by operating system 120A by summing the processing time and wait time.

After collecting the performance metric data associated with application processes 122A-C, servers 102A-C respectively provide said performance metric data to performance analysis server 104. In some embodiments, performance analysis server 104 may respectively receive a data set of service times and a data set of transaction response times from each of servers 102A-C (e.g., a service time data set from each of servers 102A-C and a transaction time data set from each of servers 102A-C for a total of six data sets). An exemplary data set of service times may either include a listing of service times (with no application process association) or a list of application processes and their corresponding of service times. Similarly, an exemplary data set of transaction response times may either include a listing of transaction response times (with no application process association) or a list of application processes and their corresponding of transaction response times.

Upon receiving the performance metric data from each of servers 102A-C, performance analysis server 104 may initiate the determination of an SPI value associated with network system 100. For example, SPI module 110 may be configured to consolidate analogous portions of the performance metric data into separate performance metric data groups. Notably, the performance metric data may be consolidated or grouped into the performance metric data groups irrespective of the originating infrastructure elements. For example, SPI module 110 may form two groupings, such as a service time group and a transaction time group. Notably, the service time group may include a plurality of service times that are grouped together regardless of the server (and/or the application) from which the service time was received. Similarly, the transaction response time group may include a plurality of transaction response times that are grouped together regardless of the server (and/or the application) from which the transaction response time was received.

After the performance metric data groups (e.g., a service time group and a transaction response time group) are established, SPI module 110 may be configured to utilize the plurality of performance metric data groups to determine an SPI value that represents an overall performance level of network system 100. In some embodiments, SPI module 110 may utilize the service time group and the transaction response time group to respectively determine the average service time and the average transaction response time of the application processes being executed by the infrastructure elements in network system 110. For example, SPI module 110 may divide the sum of all of the service times (e.g., listed in the service time group) by the number of application processes to calculate an average service time. Likewise, SPI module 100 may be configured to divide the sum of all of the transaction response times (e.g., listed in the transaction response time group) by the number of application processes to calculate an average transaction response time.

After determining the average service time and the average transaction response time, SPI module 110 may determine an SPI value for network system 100. For example, SPI module 110 may divide the calculated average service time by the calculated average transaction response time to obtain an SPI decimal value (e.g., 0.90). SPI module 110 may additionally multiply the SPI decimal value by 100 to obtain an SPI value (e.g., 90%) in a percentage format that may serve as an overall performance indicator of network system 100. One exemplary formula for the SPI value may include:

$$SPI(\%) = [\text{Average service time/Average transaction response time}] * 100$$

Upon performing the SPI calculation, SPI module 110 may be configured to present the determined SPI value to a user via UI module 108. For example, UI module 108 may receive the SPI value from SPI module 110 and present the SPI value on a computer screen display, a mobile device screen, a control room display, or any other user interface and/or display that is used by an operator or administrator of network system 100. For example, the UI module 108 may present the SPI value as a numerical value, an alert in certain scenarios (e.g., SPI value falling below a predefined threshold value), or as a plot point included in a graphical display. For instance, SPI module 110 may be configured to store the determined SPI value in repository 106 or in a local data storage unit that is accessible by UI module 108. In some embodiments, UI module 108 may utilize the calculated SPI value in conjunction with the stored historical SPI values to generate a graphical representation (e.g., line plot, pie chart, bar graph, etc.) that illustrates both the current and past performance of network system 100.

In some embodiments, network system 100 may further include a repository 106, which may be configured to store infrastructure element information (e.g., data indicating which infrastructure elements are currently being utilized to support executed applications and application processes). Although repository 106 is depicted as having a direct connection to performance analysis server 104, repository 106 may be positioned elsewhere in network system 100 and accessible by performance analysis server 104 via a communication network and/or a wireless connection without departing from the scope of the disclosed subject matter. In some embodiments, repository 106 may be included within performance analysis server 104 as a local component or element.

It will be appreciated that FIG. 1 illustrates an exemplary embodiment and that various nodes, their locations, and/or their functions as described above in relation to FIG. 1 may be changed, altered, added, or removed.

Figure 2:
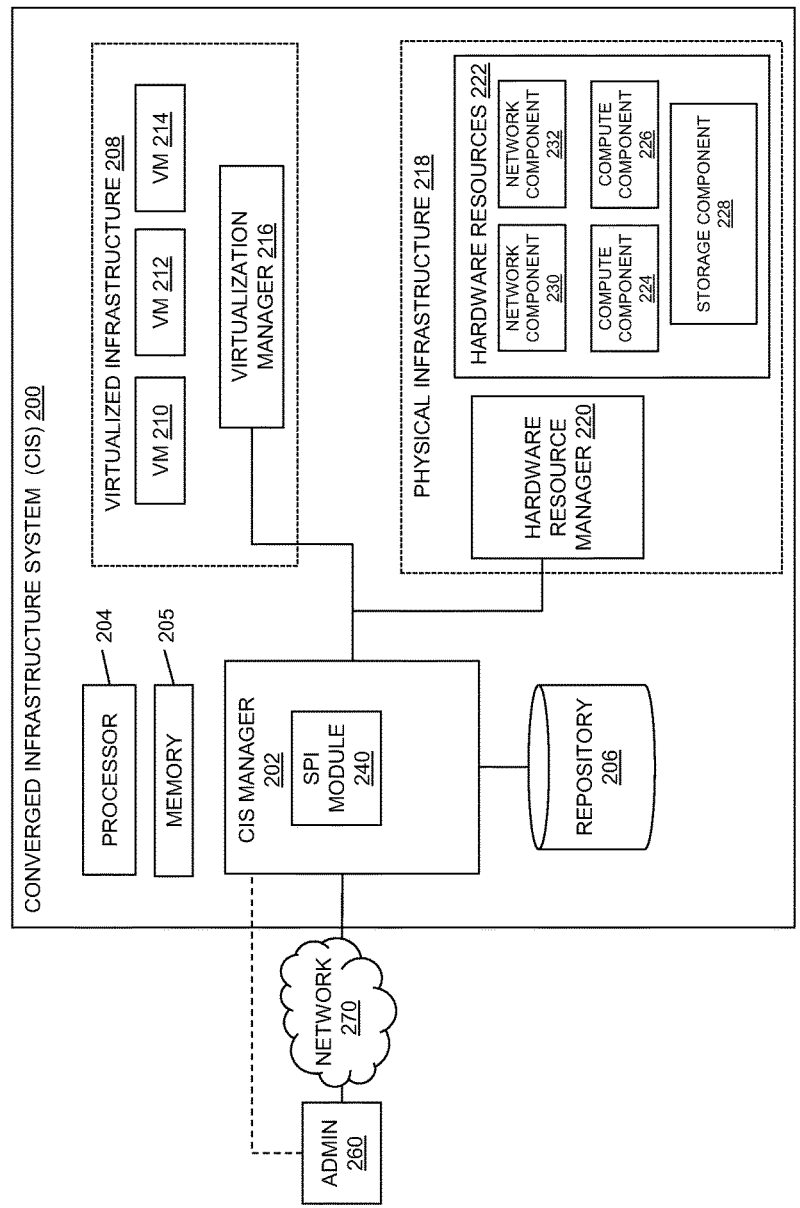
FIG. 2 illustrates an exemplary converged infrastructure system for determining a system performance indicator representative of the overall operation of the system in accordance with embodiments of the subject matter described herein.

As indicated above, the disclosed subject matter can also be utilized in a converged infrastructure system. FIG. 2 is a diagram illustrating exemplary CIS 200 according to an embodiment of the subject matter described herein. In some embodiments, CIS 200 can comprise a plurality of infrastructure elements, including one or more physical resources and one or more virtual resources. Exemplary physical resources can comprise a processor, a compute device, network equipment, a router, a switch, wiring or cabling, a storage device, a physical port, and/or a communications interface. Exemplary virtual resources can comprise a virtual entity (e.g., an entity that appears as a physical entity but comprises one or more CI components associated with one or more CISs), a virtual machine, a virtual server, a virtual storage device, a virtual port, and/or a virtual communications interface. In some embodiments, CIS 200 includes at least one processor 204 that may comprise a microprocessor (e.g., a trusted platform module (TPM) using trusted execution technology (TXT)), a central processing unit (CPU), or any other like hardware based processing unit. Likewise, CIS 200 may further include memory 205 may comprise random access memory (RAM), read only memory (ROM), optical read/write memory, cache memory, magnetic read/write memory, flash memory, or any other non-transitory computer readable medium. Notably, processor 204 may access and utilize memory 205 via a system bus or backplane to execute CIS manage 202 and/or SPI module 240 in the manner described below. CIS 200 may also comprise software and related CIEs for managing the CIS and/or portions therein.

In some embodiments, CIS 200 can be configured to provide data storage functionality, cloud service functionality, and/or other IT functionality which can support a vast number of software application workloads. CIS 200 can also be configured to communicate with various other entities, such as other CISs, network nodes, and users. For example, user 260 (e.g., a human administrator/operator or an automated system) may use an API, a command line interface, or web-based graphical user interface to login to CIS 200 to access CIS manager 202. In some embodiments, user 260 may establish communication directly with CIS 100 without use of network 270.

In some embodiments, CIS 200 can comprise a CIS manager 202 (e.g., a CIS management module), a repository 206, a virtualized infrastructure 208, and/or a physical infrastructure 218. CIS manager 202 may be any suitable entity for managing the operation of CIS 200 and may be configured to communicate with various CIEs, such as virtual resources, physical resources, and/or software for managing various CIEs. For example, CIS manager 202 may be configured to manage performance, resource utilization levels, and other aspects associated with virtualized infrastructure 208 and/or physical infrastructure 218. In some embodiments, CIS manager 202 comprises VCE Vision™ Intelligent Operations software and/or firmware that may be executed by processor 204 or any other processing unit present in CIS 200.

In some embodiments, virtualized infrastructure 208 can comprise a virtualization environment configured to simulate components of a computing device, e.g., a processor, system memory, and a storage device, for executing one or more virtual machines (VMs). For example, each of VM 210, VM 212, and VM 214 may be configured to perform various functions and/or services, such as web server functions or cloud application services, and may interact with various nodes, components, and/or users.

In some embodiments, virtualized infrastructure 208 may be associated with one or more virtual entities. Each virtual entity can comprise one or more CIS or portions therein, such as infrastructure elements from one or more CISs. In some embodiments, virtualization manager 216 may allow logical entities to be created, deleted, or modified using an API, a GUI, or a CLI. Virtualization manager 216 may be any suitable entity (e.g., software executing in a virtual machine) for managing aspects associated with virtualized infrastructure 208. In some embodiments, virtualization manager 216 may be configured to provide management functionality through one or more communications interfaces. For example, virtualization manager 216 may communicate with one or more third-party management tools using APIs. In some embodiments, virtualization manager 216 may obtain performance metric data from each of virtual machines 210-214 prior to forwarding the acquired performance metric data to SPI module 240.

Physical infrastructure 218 can comprise hardware resources 222, such as network components 230-232, compute components 224-226 (sometimes referred to as "hosts", compute devices, and/or compute servers), and at least one storage component 228, such as a storage area network (SAN). In some embodiments, one or more file share storage (FSS) systems (not shown) can be utilized to provide file system level access to a CIS across a local area network (LAN). Hardware resources 222 may be communicatively connected to various other components in CIS 200 and other entities. Hardware resources 222 can be configured to be used by one or more virtual entities. In some embodiments, network components 230-232 (e.g., network switches) may be configured to enable communication between the resources within the CIS. For example, compute component 224 and storage component 228 may be used in implementing VM 210 and VM 212 and compute server 226 and storage component 228 may be used in implementing VM 214 and virtualization manager 216.

In some embodiments, compute components 224-226 can include a hypervisor that may be configured to function as a host operating system and/or a virtual machine that runs as one or more guest application (e.g., operating system) within the hypervisor. As used herein, the term "hypervisor" can refer to computer software, firmware and/or hardware that is responsible for creating, hosting and managing guest virtual machines running on a host machine. In some embodiments, a hypervisor can be configured to function as a host operating system configured to host one or more guest operating systems. Notably, each guest operating system can function within the hypervisor as a virtual machine and provide a platform to various workload services of an application. As previously indicated, compute components 224-226 can be configured to implement virtual machines 210-214. Specifically, virtual machines 210-214 can be configured to host virtual entities including a virtual machine, a virtual server, a virtual storage device, a virtual port, and/or a virtual communications interface, and can require a virtualization software specific credential.

Hardware resource manager 220 may be any suitable entity (e.g., software executing in a virtual machine) for managing aspects associated with physical infrastructure 218. In some embodiments, hardware resource manager 220 may be configured to provision hardware resources 222 via one or more communications interfaces. For example, hardware resource manager 220 may provision hardware resources 222 in order to implement one or more virtual entities in virtualized infrastructure 208. In some embodiments, hardware resource manager 220 may comprise any management component or entity, such as a unified infrastructure manager (UIM) or a unified computing system (UCS) director entity, which is configured to manage and/or provision the physical hardware of CIS 100. In some embodiments, hardware resource manager 220 may be configured to obtain performance metric data from each of network components 230-232, compute components 224-226, and storage component 228 before forwarding all of the collected performance metric data to SPI module 240.

Repository 206 may comprise any data storage unit (e.g., a database or plurality of databases) that may be configured to function as a centralized storage unit for the CIEs of CIS 200. Although FIG. 2 depicts repository 206 as a local data storage unit residing on CIS 200, repository 206 can also be embodied as a data storage unit located at a public distributed content site, on a local proxy server in a customer's environment, or on a different CIS without departing from the scope of the disclosed subject matter. In some embodiments, repository 206 may be configured to store CIE information (e.g., data indicating which CIEs are supporting an application and/or application processes). Likewise, the CIE configuration information stored in in repository 206 may be accessed and obtained by SPI module 240. In some embodiments, SPI module 240 may utilize an API interface (e.g., a RESTful API) to communicate with repository 206.

In some embodiments, CIS manager 202 can comprise or interact with an SPI module 240. SPI module 240 can be any suitable entity (e.g., software executing on a processor) for performing one or more aspects associated with determining a system performance indicator that represents the overall operation of a network system. In some embodiments, SPI module 240 can be utilized to process performance metric data received from the CIEs in CIS 200. For example, SPI module 240 may be configured to receive performance metric data (e.g., service times and transaction response times) from each of network components 230-232, compute components 224-226, storage component(s) 228, virtual machines 210-214 and/or their respective operating systems (not shown). SPI module 240 may further be configured to receive performance metric data from other CIS infrastructure elements, such as hypervisors (not shown), load balancers (not shown), and supported applications in CIS 200 without departing from the scope of the disclosed subject matter. Specifically, each of the aforementioned infrastructure elements may include an operating system that includes a built-in software tool that is configured to measure certain performance metrics associated with an application process being executed by CIS 200. For example, the operating system (and/or its associated built-in tools) of compute component 224 may determine a service time for each of the application processes that is executed by compute component 224. Similarly, the transaction response time for each of the application processes that is executed by compute component 224 and/or its operating system may be determined by one or more of application management tools (not shown) supported by an associated application hosted by compute component 224. While performance metric data may be provided by computer component 224 (or any other CIS infrastructure element) to SPI module 240 in the manner described in FIG. 1, performance metric data may be provided from a CIE to SPI module 240 via a management element residing in CIS 200 without departing the scope of the disclosed subject matter.

After receiving the performance metric data from the CIEs and/or the management elements in CIS 200, CIS Manager 202 may initiate the determination of an SPI value associated with CIS 200. For example, SPI module 240 may be configured to consolidate analogous portions of the performance metric data into separate performance metric data groups irrespective of the originating CIEs. For example, SPI module 240 may form a service time group and a transaction time group. As indicated above, the service time group may include a plurality of service times that are grouped together regardless of the CIE (and/or the application) from which the service time was received. Similarly, the transaction response time group may include a plurality of transaction response times that are grouped together regardless of the CIE (and/or the application) from which the transaction response time was received.

Upon establishing the performance metric data groups (e.g., a service time group and a transaction response time group), SPI module 240 may be configured to utilize the plurality of performance metric data groups to determine an SPI value that represents an overall performance level of CIS 200. In some embodiments, SPI module 240 may utilize the service time group and the transaction response time group to respectively determine the average service time and the average transaction response time of the application processes being executed by the CIEs within CIS 200. For example, SPI module 240 may i) divide the sum of all of the service times by the number of application processes to calculate an average service time and ii) divide the sum of all of the transaction response times by the number of application processes to calculate an average transaction response time.

Once the average service time and the average transaction response time are determined, SPI module 240 may calculate an SPI value for CIS 200. For example, SPI module 240 may divide the calculated average service time by the calculated average transaction response time to obtain an SPI decimal value (e.g., 0.90). SPI module 240 may additionally multiply the SPI decimal value by 100 to obtain an SPI value in a percentage format that may serve as an overall performance indicator of CIS 200. Upon performing the SPI calculation, SPI module 240 may be configured to present and/or display the determined SPI value to administrative user 260 in any manner, such as described above.

In some embodiments, SPI module 240 may include or utilize at least one processor 204 and at least one memory module 205. For example, SPI module 240 may be communicatively connected to various resources via a system bus (not shown). In some embodiments, processor 204 can include a microprocessor (e.g., a trusted platform module (TPM) using trusted execution technology (TXT)), a central processing unit (CPU), or any other like hardware based processing unit. In some embodiments, SPI module 240 (and/or CIS manager 202) can be stored in memory module 205, which can include random access memory (RAM), read only memory (ROM), optical read/write memory, cache memory, magnetic read/write memory, flash memory, or any other non-transitory computer readable medium. In some embodiments, processor 204 and memory module 205 can be used to execute, implement, and/or manage the operation of SPI module 240. In some embodiments, repository 206 can include any storage medium or storage unit that is configured to store data accessible by processor 204 via the system bus. In some embodiments, repository 206 or portions thereof may utilize memory module 205.

As indicated above, the subject matter disclosed herein can be implemented in software in combination with hardware and/or firmware. For example, the subject matter described herein can be implemented in software executed by a processor (e.g., processor(s) 204 in FIG. 2). In one exemplary implementation, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, SPI module 240 and/or repository 206 (e.g., a system library or data therein) may be located at a single computing system or may be distributed across one or more devices, platforms, and/or systems. As used in the present disclosure, the terms "function" or "module" refer to hardware, firmware, or software in combination with hardware and/or firmware for implementing features described herein.

It will be appreciated that FIG. 2 illustrates an exemplary embodiment and that various nodes, their locations, and/or their functions as described above in relation to FIG. 2 may be changed, altered, added, or removed.

Figure 3:
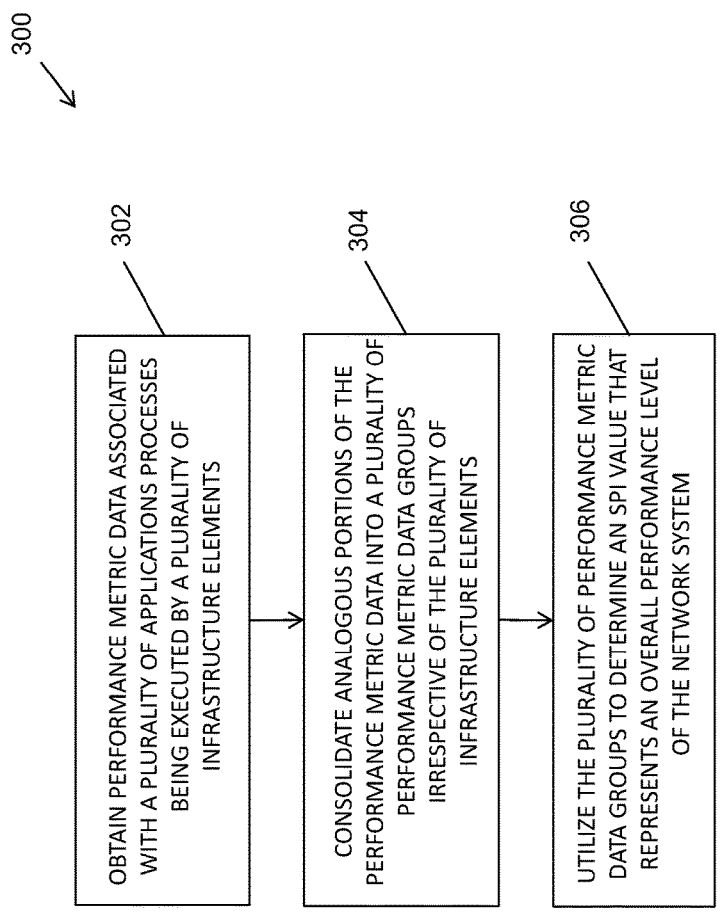
FIG. 3 illustrates a flow chart of an exemplary process for determining a system performance indicator representative of the overall operation of a network system in accordance with embodiments of the subject matter described herein.

FIG. 3 illustrates a flow chart of an exemplary method 300 for determining an SPI value representative of the overall operation of a network system in accordance with embodiments of the subject matter described herein. Although the following process is described with respect to system 100 in FIG. 1, method 300 can be implemented by CIS 200 in FIG. 2 without departing from the scope of the disclosed subject matter.

At step 302, performance metric data associated with a plurality of application processes being executed by a plurality of infrastructure elements is obtained. In one example with reference to FIG. 1, server 102A may initially determine the application processes that are currently being executed locally. For example, operating system 120A may identify each of the application processes 122A being processed by processor 116A and utilize a built-in tool(s) to determine a service time associated with each of application processes 122A. Similarly, application management tools 124A residing on server 102A may determine the transaction response times for each of application processes 122A being processed by server 102A. For example, a personal banking application workload is supported and/or hosted by server 102A and includes five (5) application processes $122A_{1...5}$ being executed via operating system 120A (and processor 116A). Operating system 120A may utilize built-in tools to determine that the service time for each of application processes $122A_{1...5}$ amounts to 2, 3, 2, 1, and 2 seconds, respectively. Similarly, application management tool $124A_1$ associated with the personal banking application (and the 5 application processes $122A_{1...5}$) may determine that the transaction response time amounts for each of application processes $122A_{1...5}$ amounts to 5, 7, 3, 6, and 4 seconds, respectively. Upon determining the service times and transaction response times of executed application processes 122A, server 102A provides this performance metric data to performance analysis server 104.

Likewise, server 102B and server 102C may also be configured to provide their respective performance metric data to performance analysis server 104. For example, server 102B may be executing a web mail application that includes three (3) application processes $122B_{1...3}$ and server 102C may be executing a monitoring application that includes two (2) application processes $122C_{1...2}$. In such a scenario, operating system 120B may utilize its built-in tools to determine that the service time for each of application processes $122B_{1...3}$ respectively equals 3, 1, and 2 seconds and operating system 120C may measure that the service time for each of application processes $122C_{1...2}$ respectively equals 1 and 3 seconds. Likewise, application management tool $124B_1$ associated with the web mail application (and the 3 application processes $122B_{1...3}$) may determine that the transaction response time amounts for each of application processes $122B_{1...3}$ amounts to 5, 4, and 6 seconds, respectively. Application management tool $124C_1$ associated with the web mail application (and the 3 application processes $122C_{1...2}$) may determine that the transaction response time amounts for each of application processes $122C_{1...2}$ respectively equals 4 and 6 seconds. In some embodiments, each of servers 102A-C provides their respective performance metric data to performance analysis server 104 in both real-time and a contemporaneous manner.

At step 304, analogous portions of the performance metric data are consolidated into a plurality of performance metric data groups. In some embodiments, performance analysis server 104 receives service time data and transaction time data from each of servers 102A-C. Continuing the with the previous example, performance analysis server 104 may utilize SPI module 110 to consolidate the received service time data together in a service time group and consolidates all of the received transaction response time data together in a transaction response time group. Notably, the service time group and the transaction response time group are formed by data irrespective of the infrastructure element (e.g., the server) responsible for providing the performance metric data. For example, SPI module 110 may consolidate the received service times (obtained in step 302) equaling 2, 3, 2, 1, 2, 3, 1, 2, 1, and 3 seconds into a service time group. Likewise, SPI module 110 may consolidate the received transaction response times (obtained in step 302) amounting to 5, 7, 3, 6, 4, 5, 4, 6, 4 and 6 seconds into a transaction response time group.

At step 306, the plurality of performance metric data groups are utilized to determine an SPI value. In some embodiments, SPI module 110 utilizes the data in both the service time group and the transaction response time group to calculate an SPI value. For example, SPI module 110 may determine an average service time by dividing all of the service times included in the service time group by the total number of application processes. Similarly, SPI module 110 may determine an average transaction response time by dividing all of the transaction response times included in the transaction response time group by the total number of application processes. For example, SPI module 110 may determine that the average service time is equal to 2 seconds (i.e., [2+3+2+1+2=3+1+2+1+3]/10=2 seconds) and that the average transaction response time is equal to 5 seconds (i.e., [5+7+3+6+4+5+4+6+4+6]/10=5 seconds). Notably, in this example, there is an overall latency of 3 seconds existing in system 100. Such latency may be attributed to the storage or delay associated with the wait time in one or more resource queues. For example, delays can be associated with different reasons, such as disk waits, network latencies, slow processes, and the like. After calculating the average service time and average transaction response time, SPI module 110 may then be configured to determine an SPI value (%) by dividing the average service time by the average transaction response time and multiplying the resulting quotient by 100. In this scenario, SPI module 110 may determine that the SPI value for system 100 is equal to 40% (i.e., [2 seconds/5 seconds]*100%=40%).

In comparison, if the application processes and infrastructure elements were fully optimized with respect to performance, the average service time may be determined to be equal to the average transaction response time. In such a scenario, for example, the calculation of the SPI value would result in 100% (e.g., [2 sec/2 sec]*100%=100%). This SPI value would serve as an indication that no latency is involved and network system 100 is operating at the highest achievable performance level.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for determining a system performance indicator representative of the overall operation of a network system, the method comprising:
    obtaining, by a performance analysis server from a plurality of infrastructure elements included in a network system, performance metric data associated with a plurality of application processes being executed by the plurality of infrastructure elements, wherein the performance metric data includes both a service time and a transaction response time for each of the plurality of application processes, wherein the service time is an amount of time an infrastructure element executes an application process and the transaction response time is an amount of time between when the infrastructure element receives a query for executing the application process and when the infrastructure element sends a response to the query, wherein the plurality of infrastructure elements includes computer servers that provide the performance metric data to the performance analysis server in a contemporaneous manner;
    consolidating, by the performance analysis server, analogous portions of the performance metric data into a service time data group and a transaction response time group irrespective of the plurality of infrastructure elements;
    utilizing, by the performance analysis server, both the service time data group and a transaction response time group to determine a system performance indicator (SPI) value that represents an overall performance level of the network system; and
    presenting, by the performance analysis server, the determined SPI value to a user via a user interface or display.

2. The method of claim 1 wherein the obtaining, consolidating, and utilizing steps are performed contemporaneously.

3. The method of claim 1 wherein obtaining the performance metric data includes obtaining a service time and a transaction response time for each of the plurality of application processes.

4. The method of claim 3 wherein the plurality performance metric data groupings includes a service time group comprising a plurality of obtained service times and a transaction request time group comprising a plurality of obtained transaction request times.

5. The method of claim 4 wherein the SPI value is generated in part by dividing a sum of the obtained service times by a sum of the plurality of transaction response times.

6. The method of claim 1 wherein the infrastructure components include converged infrastructure components located within a converged infrastructure system (CIS).

7. The method of claim 6 wherein each of the infrastructure components is selected from a group consisting of a compute component, a network component, a storage component, and a virtual machine.

8. A system for determining a system performance indicator representative of the overall operation of a network system, the system comprising:
    a performance analysis server including at least one processor, memory, and a system performance indicator (SPI) module utilizing the at least one processor and the memory, wherein the SPI module is configured to:
        obtain, from a plurality of infrastructure elements included in a network system, performance metric data associated with a plurality of application processes being executed by the plurality of infrastructure elements, wherein the performance metric data includes both a service time and a transaction response time for each of the plurality of application processes, wherein the service time is an amount of time an infrastructure element executes an application process and the transaction response time is an amount of time between when the infrastructure element receives a query for executing the application process and when the infrastructure element sends a response to the query, wherein the plurality of infrastructure elements includes computer servers that provide the performance metric data to the performance analysis server in a contemporaneous manner;
        consolidate analogous portions of the performance metric data into a service time data group and a transaction response time group irrespective of the plurality of infrastructure elements;
        utilize both the service time data group and a transaction response time group to determine a system performance indicator (SPI) value that represents an overall performance level of the network system; and
        present the determined SPI value to a user via a user interface or display.

9. The system of claim 8 wherein the SPI module is configured to obtain the performance metric data, consolidate the analogous portions of the performance metric data, and utilize the plurality of performance metric data groups to generate a SPI value in a contemporaneous manner.

10. The system of claim 8 wherein the SPI module is further configured to obtain a service time and a transaction response time for each of the plurality of application processes.

11. The system of claim 10 wherein the plurality performance metric data groupings includes a service time group comprising a plurality of obtained service times and a transaction request time group comprising a plurality of obtained transaction request times.

12. The system of claim 11 wherein the SPI module is further configured to generate the SPI value by dividing a sum of the obtained service times by a sum of the plurality of transaction response times.

13. The system of claim 8 wherein the infrastructure components include converged infrastructure components located within a converged infrastructure system (CIS).

14. The system of claim 13 wherein each of the infrastructure components is selected from a group consisting of a compute component, a network component, a storage component, and a virtual machine.

15. A non-transitory computer readable medium having stored thereon executable instructions which, when executed by a processor of a computer, cause the computer to perform steps comprising:

obtaining, by a performance analysis server from a plurality of infrastructure elements included in a network system, performance metric data associated with a plurality of application processes being executed by the plurality of infrastructure elements, wherein the performance metric data includes both a service time and a transaction response time for each of the plurality of application processes, wherein the service time is an amount of time an infrastructure element executes an application process and the transaction response time is an amount of time between when the infrastructure element receives a query for executing the application process and when the infrastructure element sends a response to the query, wherein the plurality of infrastructure elements includes computer servers that provide the performance metric data to the performance analysis server in a contemporaneous manner;

consolidating, by the performance analysis server, analogous portions of the performance metric data into a service time data group and a transaction response time group irrespective of the plurality of infrastructure elements;

utilizing, by the performance analysis server, both the service time data group and a transaction response time group to determine a system performance indicator (SPI) value that represents an overall performance level of the network system; and presenting, by the performance analysis server, the determined SPI value to a user via a user interface or display.

16. The computer readable medium of claim 15 wherein the obtaining, consolidating, and utilizing steps are performed contemporaneously.

17. The computer readable medium of claim 15 wherein obtaining the performance metric data includes obtaining a service time and a transaction response time for each of the plurality of application processes.

18. The computer readable medium of claim 17 wherein the plurality performance metric data groupings includes a service time group comprising a plurality of obtained service times and a transaction request time group comprising a plurality of obtained transaction request times.

19. The computer readable medium of claim 18 wherein the SPI value is generated in part by dividing a sum of the obtained service times by a sum of the plurality of transaction response times.

20. The computer readable medium of claim 15 wherein the infrastructure components include converged infrastructure components located within a converged infrastructure system (CIS).

* * * * *